Figure 3:
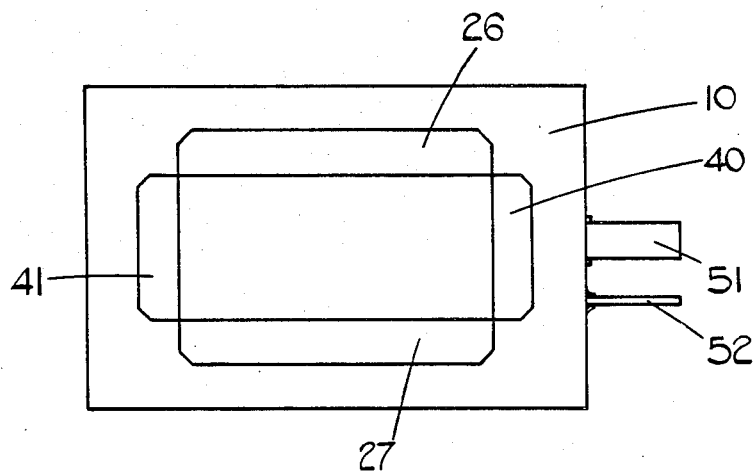

United States Patent [19]

Beech

[11] 4,222,023
[45] Sep. 9, 1980

[54] ELECTRICAL COIL ASSEMBLY

[75] Inventor: Keith J. W. Beech, Aldridge, Walsall, England

[73] Assignee: Lucas Industries Limited, Birmingham, United Kingdom

[21] Appl. No.: 53,082

[22] Filed: Jun. 28, 1979

[30] Foreign Application Priority Data

Jul. 5, 1978 [GB] United Kingdom ............... 28911/78

[51] Int. Cl.² ............................................. H01F 27/30
[52] U.S. Cl. .................................................. 336/209
[58] Field of Search ............... 336/206, 198, 208, 209, 336/192; 310/208, 43

[56] References Cited

U.S. PATENT DOCUMENTS

| 1,797,768 | 3/1931 | Goad | 336/209 |
| 2,749,525 | 6/1956 | Henderson | 336/209 |
| 4,160,967 | 7/1979 | Beech | 336/209 |

Primary Examiner—Thomas J. Kozma
Attorney, Agent, or Firm—Trexler, Wolters, Bushnell & Fosse, Ltd.

[57] ABSTRACT

An electrical coil assembly comprises a rectangular annular coil and a dustproof cover therefor. The cover is formed of a folded blank of electrically insulating sheet material which has a rectangular annular portion with a rectangular aperture. A first pair of opposed flaps and a second pair of opposed flaps are integrally joined to the external periphery of the portion. Each flap has a first tongue portion which is passed through the aperture and a second tongue portion which overlies a respective side of the aperture in the coil. The width of each tongue portion is greater than the length of the respective side of the aperture in the coil. The width of each tongue portion is not greater than the length of the respective side of the apertures. This blank is easy to assemble into a cover and there is a reduced risk of tearing the flaps.

6 Claims, 4 Drawing Figures

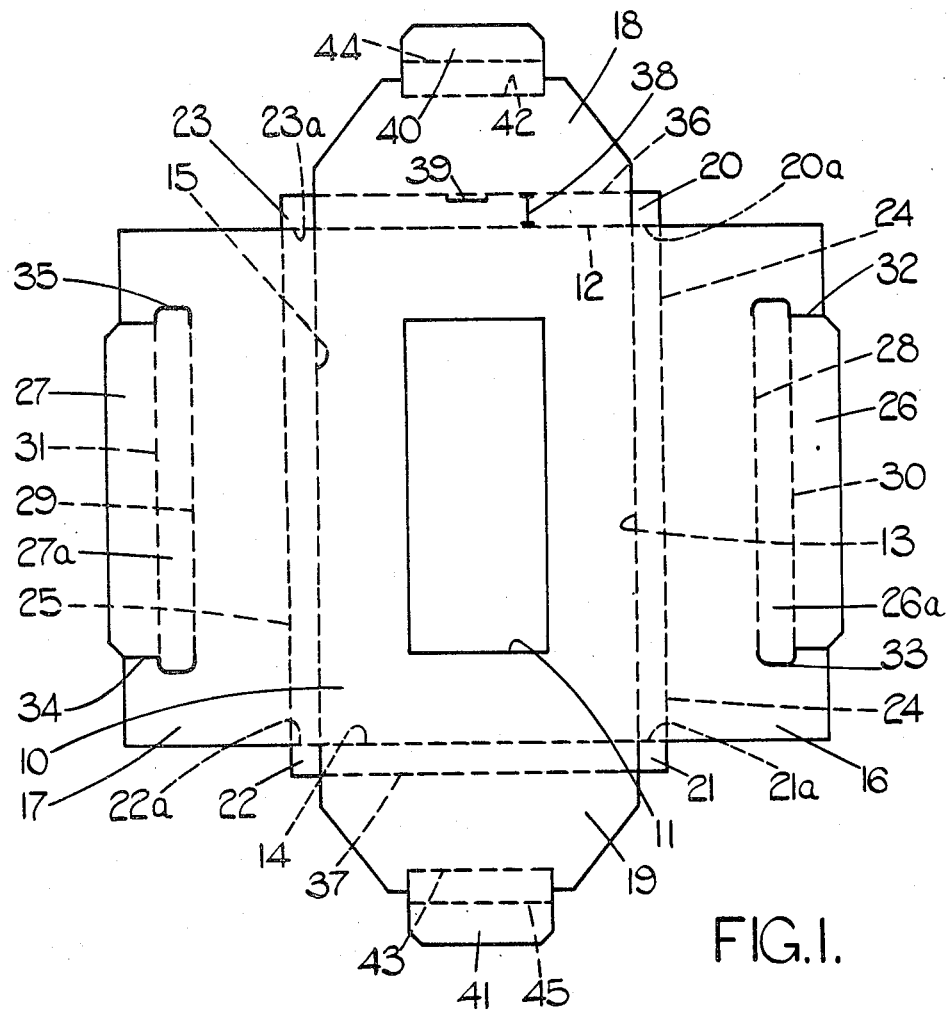
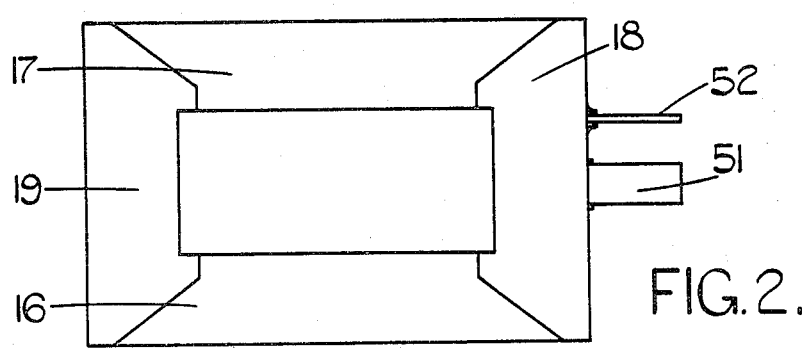

ELECTRICAL COIL ASSEMBLY

This invention relates to an electrical coil assembly and is particularly, though not exlusively, concerned with an electrical coil assembly for use in a field coil arrangement of a motor vehicle starter motor.

In our German Offenlegungsschrift No. 2737279, we disclosed an electrical coil assembly in which a flat annular coil of substantially rectangular form is provided with a dustproof covering formed of a sheet of flexible electrically insulating material cut and folded to provide flaps which seal the inner and outer peripheries of the coil so as to provide a substantially dustproof seal.

Such a sheet material is provided in the form of a preformed blank which is subsequently folded around the coil. The blank as described in our German Offenlegungsschrift No. 2737279 comprises a rectangular annular portion having a pair of outer flaps extending along opposite longitudinal side edges of the annular portion and being integrally interconnected therewith, and a further pair of flaps which are integrally connected to the short edges of the rectangular aperture in the annular portion. During manufacture of the electrical coil assembly, the coil is placed on the annular portion, the two outer flaps extending from the outer periphery of the annular portion are folded inwardly and through the rectangular aperture in the annular portion of the blank and then the two inner flaps extending from the inner periphery of the annular portion are folded through the aperture in the coil and then folded outwardly.

It is a disadvantage of the above-described construction that the assembly operation is not ideally suited to mass production in view of the folding sequence which has to be performed using the blank as described in German Offenlengungsschrift No. 2737279.

Accordingly, it is an object of the present invention to obviate or mitigate this latter disadvantage.

Also the construction described in the German Offenlengungsschrift No. 2737279 is such that the two outer flaps which are folded inwardly have a width which is slightly greater than the corresponding dimension of the aperture in the annular portion through which they pass. The reason for this is to ensure that a good dustproof seal is provided at the inner periphery of the coil assembly.

Whilst such an arrangement is generally satisfactory in that a dustproof seal can be obtained, there arises the problem that there is a risk of tearing the outer flaps when passing them through the aperture in the annular portion which can deleteriously affect the sealing properties of the cover as well as making assembly more difficult. Accordingly, it is an object of a preferred feature of the present invention to obviate or mitigate this disadvantage.

According to the present invention, there is provided an electrical coil assembly comprising a substantially rectangular annular coil and a substantially dustproof cover therefor, said cover being formed of a folded blank of electrically insulating sheet material, said blank including a substantially rectangular annular portion and two pairs of mutually opposed flaps which are folded around respective sides of the aperture in the coil to seal the inner periphery thereof, wherein the flaps of both pairs are provided, in the unfolded blank, externally of the substantially rectangular annular portion, whereby the end portions of all of the flaps are disposed on the same side of the electrical coil assembly.

The construction described in the last proceding paragraph enables all the flaps to be folded inwardly and through the aperture which itself facilitates assembly as compared with a construction in which some of the flaps are folded outwardly and some inwardly. In addition to this, the location of the end portions of all of the flaps on one side of the coil assembly facilitates securing of the flaps in position. These advantages are particularly useful in the mass production of such coil assemblies. A further advantage is that, after the end portions of the flaps have been pushed through the aperture in the coil, they can be bent to stay suitably positioned, without being held, for sealing down using a single tool.

Assembly of the cover is further facilitated if the end portions of the flaps are tapered to provide a lead-in when being inserted through the aperture in the coil.

Preferably, each of one of the pairs of mutually opposed flaps includes a first tongue portion which has been passed through the aperture in the annular portion of the blank and a second tongue portion which overlies the respective side of the aperture in the coil, characterized in that the second tongue portion of each flap has a width which is greater than the length of the respective side of the aperture in the coil whilst said first tongue portion of each flap has a width which is not greater than the length of the respective side of the apertures in the coil and the annular portion of the blank.

By this means, the risk of the flaps being torn during assembly is mitigated whilst still retaining the facility for ensuring that the inner periphery of the coil is properly sealed by the cover. The provision of such a flap construction also improves the ease of assembly.

Preferably, said second tongue portion of each of the flaps is joined to the remainder of the flap by a joint which has a length which is not greater than the length of the respective side of the coil aperture. By this means, it is ensured that ready deformation of the sides of the second tongue portion will occur so as to improve further the ease of assembly.

Figure 4:
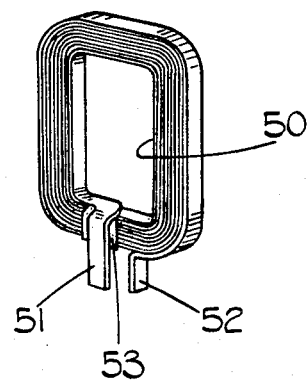

An embodiment of the present invention will now be described, by way of example, with reference to the accompanying drawings in which:

FIG. 1 is a plan view of a blank for use in an electrical coil assembly according to one embodiment of the present invention, FIG. 2 is a plan view showing one face of an electrical coil assembly including a cover formed from the blank illustrated in FIG. 1, FIG. 3 is a plan view of the other side of the electrical coil assembly of FIG. 2, and FIG. 4 is a perspective view, on a smaller scale, of the electrical coil in the assembly illustrated in FIGS. 2 and 3.

Referring now to FIG. 1, the blank is cut from a sheet of flexible, electrically insulating and heat resistant vegetable fibre board with is non-porous. In this embodiment, the board is formed of Pressphan. The blank comprises a substantially rectangular, annular portion 10 having a rectangular aperture 11 therethrough. The annular portion 10 is defined by four fold lines indicated by dotted lines 12 to 15. Integrally joined to opposite longitudinal edges of the annular portion 10 along the fold lines 13 and 15 are a first pair of flaps 16 and 17, respectively. A second pair of flaps 18 and 19 are joined integrally to the short edges of the annular portion 10 along respective fold lines 12 and 14. Thus, the flaps 16 to 19 are all disposed externally of the annular portion 10. The blank further includes four further flaps 20 to 23 which are disposed outwardly of the respective four corners of the annular portion 10, separated from the respective flaps 18 and 19 but joined to the respective flaps 16 and 17 along fold lines 20a, 21a, 22a, and 23a, respectively. The fold lines 20a and 23a are aligned with the fold line 12 whilst the fold lines 21a and 22a are aligned with the fold line 14. Each flap 16, 17 has a respective fold line 24, 25 thereon which is parallel to the fold line 13, 15 and which is spaced therefrom by a distance corresponding to the corresponding dimension of the respective flaps 20, 21 and 22, 23. The free end portion of the flap 16, 17 i.e. that end portion remote from the respective fold line 13, 15, includes a respective tongue 26, 17 which is joined to the remainder of the respective flap 16, 17 by a respective fold line 28, 29 which extends parallel to the fold lines 13, 15, 24 and 25. Intermediate its ends, each tongue 26, 27 is provided with a respective fold line 30, 31 which is parallel to the fold line 28, 29, respectively. At its sides each tongue 26, 27 is separated from the remainder of the respective flaps 16, 17 by a configurated cut line 32, 33 and 34, 35. Each cut line 32 to 35 is so shaped that a portion 26a, 27a of the flap 26 27 lying between the respective fold lines 28, 30, and 29 31 is of a length which is greater than the length of the rectangular aperture 11 in the annular portion 10. However, the fold lines 28 to 31 are of a length which is equal to that of the aperture 11. Each tongue 26, 27 projects marginally beyond the free end of the remainder of the respective flap 16, 17 and, apart from chamfering on the free end of each tongue 26, 27 to provide a lead-in, the portion of each tongue 26, 27 externally of the respective fold line 30, 31 is of a width which is equal to the length of the rectangular aperture 11.

Each flap 18, 19 has a fold line 36, 37 thereon which extends parallel to the respective fold line 12, 14 and is aligned with the edge of the flaps 20, 23, and 21, 22 which is remote from the respective flap 16, 17. In the portion of the flap 18 which is between the fold lines 12 and 36, there is provided an I-shaped cut 38 and a shallow U-shaped cut 39. The I-shaped cut 38 extends transversely between the fold lines 12 and 36 whilst the base of the U-shaped cut 39 extends parallel to and adjacent the fold line 36. Externally of the fold line 36, 37 each flap 18, 19 is chamfered inwardly and includes a respective tongue 40, 41. Apart from being chamfered at the free end thereof from lead-in purposes, each tongue 40, 41 has a width which is equal to the width of the rectangular aperture 11. Each tongue 40, 41 is joined to the remainder of the flap 18, 19 along a fold line 42, 43 respectively. Intermediate the ends of the tongue 40, 41 there is provided a respective fold line 44, 45 which is parallel to the respective fold line 42, 43. The fold lines 24, 25, 36, 37, 30, 31, 44 and 45 and the respective fold line 13, 15, 12, 14, 28, 29, 42 and 43 are spaced equidistantly apart the spacing being equal to the thickness of the coil illustrated in FIG. 4.

Referring now to FIG. 4, the coil is a flat annular coil of substantially rectangular form having a rectangular aperture 50 therein. The dimensions of the aperture 50 are the same as the dimensions of the rectangular aperture 11 in the annular portion 10 of the blank whilst the outer dimensions of the coil are equal to the outer dimensions of the annular portion 10 of the blank. The coil is formed of a spirally-wound strip of copper with an insulating strip (not shown) between the turns of the coil. The width of the copper strip is equal to the thickness of the coil. The coil has leads 51 and 52 outwardly extending therefrom. The lead 51 is integral with the inside of the coil and is insulated from the turns of the coil by means of an insulating strip 53 at the location where it passes over the turns of the coil. The lead 52 extends in the same directions as the lead 51 with its plane at right-angles to that of the lead 51.

During manufacture of the electrical coil assembly, the coil as described with reference to FIG. 4 is placed on the annular portion 10 of the blank with the leads 51 and 52 facing the flaps 18. Following this, the flaps 16 and 17 are folded around the longitudinal outer side edges of the coil, as permitted by the fold lines 13, 24 and 15, 25. At the same time, the tongues 26 and 27 are folded about their respective fold lines 28 and 29 and inserted through the aperture 50 in the coil until the portions of the tongues 26 and 27 which lie outwardly of the fold lines 30 and 31 have passed completely through the aperture 50 and through the aperture 11 in the annular portion 10 of the blank. In this position of the tongues 26 and 27, the portions thereof which lie between the respective fold lines 28, 30 and 29, 31 lie against the respective inner longitudinal sides of the coil, i.e. against the respective longitudinal side wall of the aperture 50 in the coil. Because the width of such portion of each tongue 26, 27 is greater than the corresponding dimension of the coil, the portions of the tongue 26, 27 which lie beyond the ends of the respective fold lines 28, 30 and 29, 31, i.e. the portions defined by the cuts 32 to 35, are bent around the respective corners of the aperture 50 to lie against the short side walls of the aperture 50. Insertion of the tongues 26 and 27 through the aperture 50 is facilitated because of the previously described construction of the tongues 26 and 27 and because of the chamfered free ends thereof. Following this, the further flaps 20 to 23 are folded inwardly at right-angles to their positions illustrated in FIG. 1 by folding about the respective fold lines 20a to 23a. In this position, the further flaps 20 to 23 lie against the outer periphery of the coil in the region of the curved corners.

Then, the flaps 18 and 19 are folded inwardly whilst ensuring that the leads 51 and 52 extend through the respective cuts 39 and 38. The portions of the flaps 18 and 19 which lie between the respective fold lines 12, 36 and 14, 37 trap the further flaps 20 to 23 in position. Folding of the flaps 18, 19 occurs about the respective fold lines 12, 36 and 14, 37. The tongues 40 and 41 are inserted into the aperture 50 by folding them about the respective fold lines 42, 43 until the respective fold lines 42, 43 lie against the respective short sides of the aperture 50. In this position, the portions of the tongues 40 and 41 lying outwardly of the respective fold lines 44 and 45 project through the aperture 50 and the aperture 11. Outward folding of the tongues 26, 27, 40 and 41 as permitted by the respective fold lines 30, 31, 44 and 45 serves to retain temporarily the tongues in the required positions. It will thus be appreciated that the portions of the flaps 26, 27, 40 and 41 which lie outside the respective fold lines 30, 31, 44 and 45 are all disposed on the same face of the coil assembly and can be easily secured in position by a heating tool. In this respect, the inner surface of the blank will have been previously coated with a heat activatable adhesive, e.g. a polyvinylbutyrate adhesive on those parts of the blank which are to be adhesively secured. It is to be appreciated from the above that the portions of the flaps 18 and 19 which are disposed inwardly of the tongues 40 and 41 will overlap parts of the flaps 16 and 17 which are defined by the cuts 32 to 35. Thus, a good seal is obtained at these locations and it is at these locations that adhesive is provided on the flaps 18 and 19. As can be seen from FIG. 1, the fold lines 42 and 43 along which the tongues 40 and 41 are connected with the remainder of the flaps 18 and 19 are disposed inwardly of the free end of said remainder of the respective flaps 18 and 19 so as to ensure a good overlap of the remainder of the flaps 18 and 19 (see FIG. 2). The tongues 40 and 41 also overlie those portions of the tongues 26 and 27 which lie against the short side walls of the aperture 50 so as to ensure that a dustproof seal is provided around the inner periphery of the coil. An hermetic seal around the outer periphery of the coil is ensured by the provision of the flaps 20 to 23.

As a final operation, the whole coil assembly is bent to arcuate form, the axis of the arc being parallel to the longitudinal direction of extent of the coil and the direction of bending being such that the surface illustrated in FIG. 3 is a concave surface while the surface illustrated in FIG. 2 is a convex surface.

If desired, a sealant may be provided at the bases of the leads 51 and 52 where they extend through the cuts 38 and 39. However, if the cuts are made sufficiently accurate it is envisaged that the provision of such a sealant may not be required, particularly in view of the provision of the insulating strip 53 in this region. It will be appreciated that the provision of a dustproof cover for the coil is particularly necessary where the entry of electrically conducting dust to the coil can cause shorting of the turns of the coil.

In a modification, adhesive is not provided over the whole of the surface of the blank but only over those parts of the blank which are destined to overlap with and secured to other parts of the blank. The adhesive itself may be used to provide a seal at the bases of the leads.

I claim:

1. An electrical coil assembly comprising a substantially rectangular annular coil and a substantially dustproof cover therefor, said cover being formed of a folded blank of electrically insulating sheet material, said blank including a substantially rectangular annular portion and two pairs of mutually opposed flaps which are folded around respective sides of the aperture in the coil to seal the inner periphery thereof, wherein the flaps of both pairs are provided, in the unfolded blank, externally of the substantially rectangular annular portion whereby end portions of all of the flaps are disposed on the same side of the electrical coil assembly.

2. An assembly as claimed in claim 1, wherein the end portions of the flaps are tapered to provide a lead-in when being inserted through the aperture in the coil.

3. An assembly as claimed in claim 1, wherein each of one of the pairs of mutually opposed flaps includes a first tongue portion which has been passed through the aperture in the annular portion of the blank and a second tongue portion which overlies the respective side of the aperture in the coil, characterized in that the second tongue portion of each flap has a width which is greater than the length of the respective side of the aperture in the coil whilst said first tongue portion of each flap has a width which is not greater than the length of the respective side of the apertures in the coil and the annular portion of the blank.

4. An assembly as claimed in claim 3, wherein said second tongue portion of each of the flaps is joined to the remainder of the flap by a joint which has a length which is not greater than the length of the respective side of the coil aperture.

5. An assembly as claimed in claim 3, wherein each of the other pair of mutually opposed flaps has a width which is not greater than the length of the respective side of the apertures in the coil and the annular portion of the blank.

6. An assembly as claimed in claim 1 or 3, wherein the apertures in the coil and in the blank are of the same size.

* * * * *